Sept. 1, 1964  R. H. TWYFORD  3,146,589
ROCKET NOZZLE
Filed Nov. 12, 1958  2 Sheets-Sheet 1
Fig. 1.
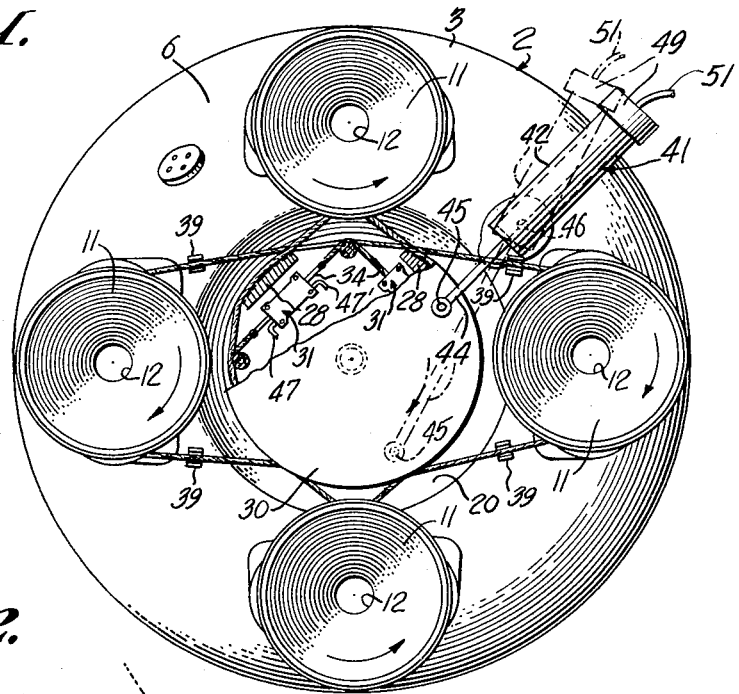
Fig. 2.
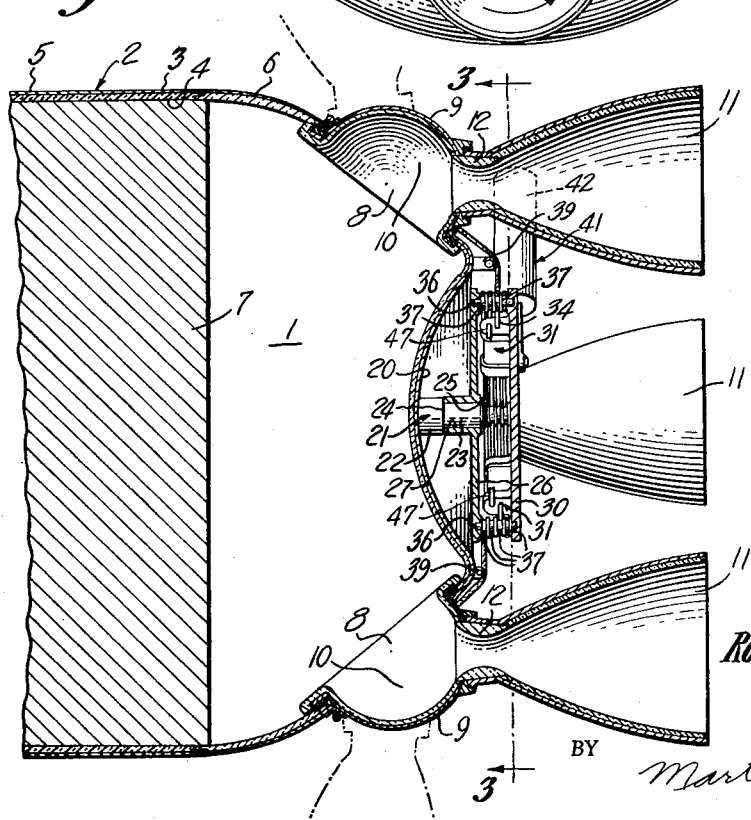
Fig. 6.
INVENTOR
*Robert H. Twyford*
BY *Martha L. Ross*
AGENT

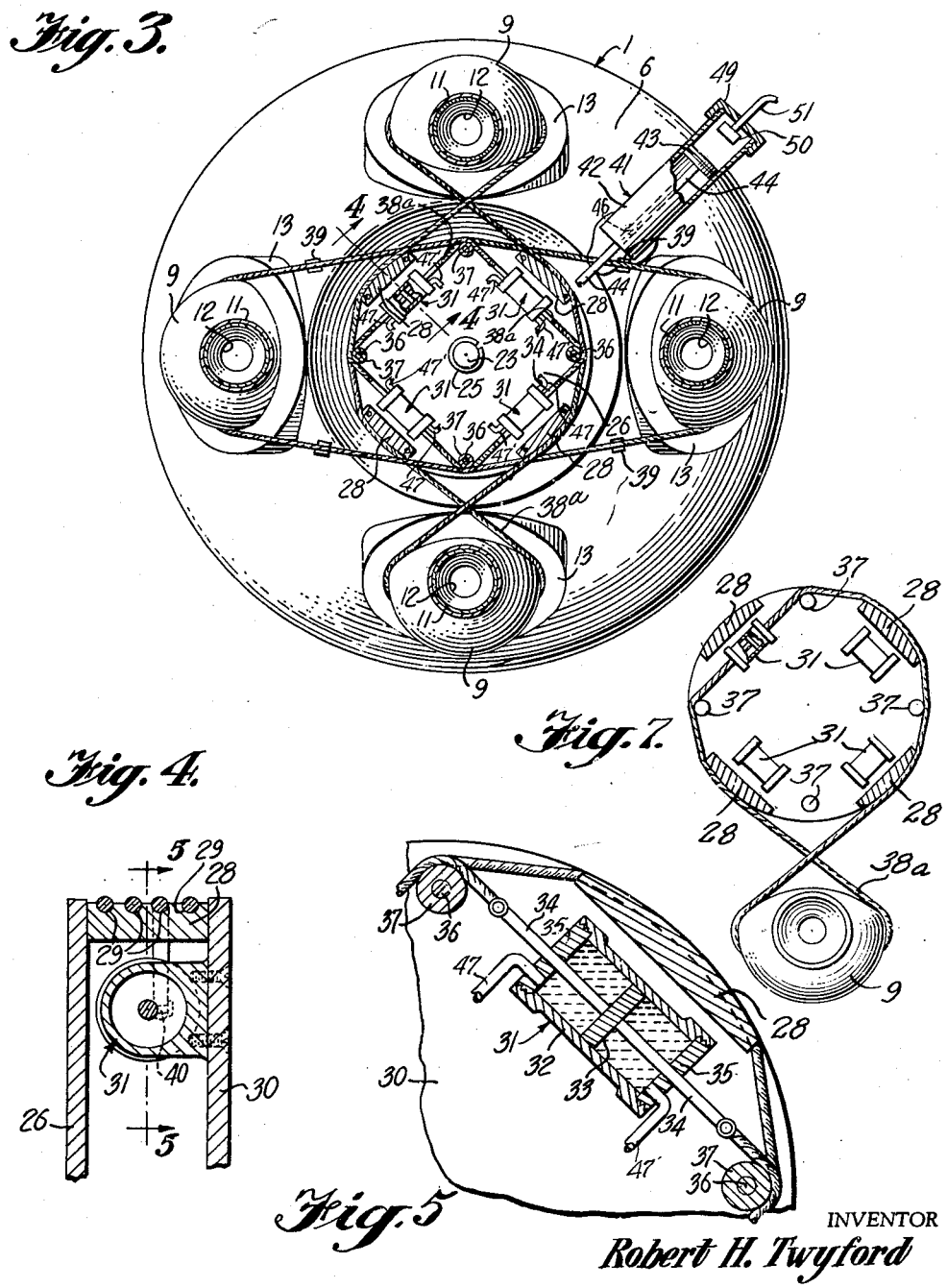

United States Patent Office 3,146,589
Patented Sept. 1, 1964

3,146,589
ROCKET NOZZLE
Robert H. Twyford, Alexandria, Va., assignor to Atlantic Research Corporation, Alexandria, Va., a corporation of Virginia
Filed Nov. 12, 1958, Ser. No. 773,520
5 Claims. (Cl. 60—35.55)

This invention relates to multi-stage rockets in which it may be essential or desirable to provide means for effecting angular deviation of the rocket with respect to its direction of normal thrust; or reversing the thrust of the posterior stage, for suddenly slowing down said stage, thus assisting in the separation of the anterior stage.

The general object of the invention is to provide a jet motor with means for deflecting the course of said motor, or neutralizing or reversing its momentum by diverting components of the aggregate thrust, which may amount to the entire thrust, away from the axis of normal thrust, at points displaced about said axis.

A more specific object of the invention is the provision of a jet motor as above described having deflectable exhaust nozzles grouped symmetrically about the longitudinal axis of the reaction chamber, in which the necessarily large range of amplitude of the swing of the nozzles, from a rearward position in which the control of yaw, roll and pitch require relatively small movements, to a forward position in which the direction of thrust is reversed, is obtained by mounting the nozzles fixedly on rotatable turrets, the axes of the latter being divergent rearwardly from a point on the longitudinal axis of the reaction chamber, and the axes of the nozzles so angularly related to the axes of the turrets that in their rearward limit position, the nozzles are substantially axially parallel to said longitudinal axis, while in their forward limit position, their axes are directed forwardy of a plane perpendicular to the longitudinal axis which embraces the centers of rotation of the turrets.

Other objects of the invention will appear as the following description of a practical embodiment thereof proceeds.

In the drawings which accompany and form a part of the following specification and throughout the figures of which the same reference characters denote identical parts, FIGURE 1 is an end view of a rocket partly in elevation and partly in section showing four turret-mounted nozzles and the controls therefor.

FIGURE 2 is a longitudinal sectional view of the exhaust end of the thrust chamber showing the turret control mechanism.

FIGURE 3 is a section taken along the line 3—3 of FIGURE 2.

FIGURE 4 is a section taken along the line 4—4 of FIGURE 3.

FIGURE 5 is a section taken along the line 5—5 of FIGURE 4.

FIGURE 6 is an enlarged sectional view of the rotary joint structure between the wall of the combustion chamber and the turrets.

FIGURE 7 is a plan view showing diagrammatically one of the similar independent cable systems individual to each of the turrets for transmitting movement thereto from a central rotor.

Referring now in detail to the drawing the numeral 1 represents a chamber in which high pressure gases are produced by combustion of a body of solid propellant 7, the chamber being enclosed by wall 2, consisting of a structural shell 3 and an interior liner 4 of suitable, protective heat insulation material. The wall 2, as shown, has the cylindrical body portion 5 and rounded exhaust end portion 6. A rocket employing solid propellant has been selected for illustrating this invention solely in the interest of simplification of disclosure, but it is to be understood that the invention is equally applicable to jet motors generally, without regard to the type of propellant, fuel or other motive pressure agent employed. The jet motor can be of the air-breathing type, such as a ram jet, or operated by gases, such as steam, introduced into the chamber or plenum under high pressure.

The end portion 6 is provided with a pattern of circular apertures 8, in the present instance 4, of the same diameter, arranged in symmetrical displacement about the longitudinal axis of the combustion chamber, having their circumferences in similarly inclined planes convergent preferably at angles of less than 45° toward the longitudinal axis of the combustion chamber, as shown. Turrets 9 are rotatably mounted in these apertures extending outwardly therefrom and being of generally hemispherical shape. The axes of rotation of the turrets in the illustrated embodiment are perpendicular to said inclined planes and therefore at angles greater than 45° to the longitudinal axis of the combustion chamber. The turrets have the form of concavo-convex shells which enclose chambers 10, the latter being extensions of the combustion chamber and are herein referred to as blast chambers.

Each of the turrets is provided with an exhaust nozzle 11. These nozzles are preferably arranged with their axes similarly inclined to the axes of rotation of the respective turrets at such an angle that in one mutual position of the turrets the axes of the turrets are parallel to the longitudinal axis of the combustion chamber. This is the position in which, if maintained, there is no deviation from the gravitationally determined trajectory of the rocket.

It is obvious that if the turrets were capable of complete rotation the axis of each nozzle would describe a cone of revolution about the axis of rotation of the corresponding turret. The axial section through such cone would embrace an angle of more than 90° so that if in one position of the nozzle its axis is parallel to the longitudinal axis of the combustion chamber, in the position of the nozzle with the turret 180° displaced, its axis would extend beyond a plane perpendicular to the longitudinal axis of the combustion chamber, passing through the foot of said axis, this being the position of the nozzles indicated in broken lines in FIGURE 2, in which the thrust is reversed. If the axial section through the cone of revolution of the axes of the nozzles were precisely 90°, the maximum result obtainable would be neutralization of the normal thrust. As a matter of practical construction, the turrets are not rotated through a complete revolution but displaceable through a maximum arc of substantially 180°, to move the nozzles from the position in which they are axially parallel to the direction of normal thrust to the position of reverse thrust.

The magnitude of the diameter of the cone of revolution of the axes of the nozzles is limited by the proximity of fixed structure adjacent the path of revolution of the nozzles which lies closest to the end of the combustion chamber. In the present example, if the turrets were more protuberant than shown, there would be room for the nozzles when in reverse thrust position to be tilted further forward than shown in FIGURE 2 in broken lines, before being obstructed by the end of the combustion chamber, thus increasing the reverse thrust.

It is noted that the wall structure of the turrets and nozzles is similar to that of the combustion chamber in that it comprises a thin metal shell protected by a heat insulating liner. The throat of each nozzle is lined by an annular ring 12 of venturi shape made of ceramic or other heat resistant material.

The structure of the rotary joint between the turrets and the end wall of the combustion chamber is best shown in FIGURE 6, in which it will be noted that the metal shell 3 is flanged outwardly about each of the apertures 8, the flanges 13 forming a bearing surface of some depth about the turrets. Each turret extends within the end wall 6 of the combustion chamber and has its wall at the lower end bent circumferentially so as to provide a portion parallel to its plane of rotation and then upwardly toward the end wall 6, forming an annular trough 14 underlying said end wall. Sealing gasket 15 tightly occupies this trough, being rotatable therewith and having a planiform face 16 parallel to the plane of rotation. Above the gasket 15 the insulating liner 4 is cut away to form an annular recess, the base of which functions as a seat for a complementary annular gasket 17, the latter having a planiform face 18 parallel to the face 16 but actually out of contact therewith, the intervening space being occupied by lubricant of such stiff character as to resist being displaced by the high pressure of the combustion chamber. The upturned end of the trough 14 is also out of contact with the end wall 6 for the purpose of minimizing friction. The joint is further leak proofed by the provision of an O-ring 19, seated in an annular groove in the flange 13 and bearing against the outer shell of the turret.

FIGURE 2 shows that the end of the combustion chamber has a dished central portion 20 and that the turrets are located within a zone surrounding the dished portion. The means for operating the turrets is positioned with reference to the dished portion, and the purpose of the reentrant shape of the latter is to enable the operating means to be placed as close as possible to the end wall of the combustion chamber in the promotion of compactness.

Centrally located within the dished portion 20 is a fixed cylindrical post 21, having a base part 22 of larger diameter than the upper part 23, so that an annular shoulder 24 is formed between the parts. The upper part has a groove for a snap ring 25, adjacent its upper end. The post is coaxial with the combustion chamber. A circular inner plate 26 has a concentric socket 27 on its under face which rotatably fits the upper part of the post 21, resting upon the shoulder 24, the plate 26 being retained by the snap ring 25. At 90° intervals the plate 26 is provided on its upper face with cable guide blocks 28, fixed thereto, the front faces of said blocks being curved to coincide with the circumference of said plate and being formed with stacked guide grooves 29 for 4 cables. The guide blocks 28 are of equal height and fixedly support an outer plate 30 in spaced relation to the inner plate 26, said plates constituting a turntable, itself functioning as a pulley by virtue of the cable guide blocks 28 arranged about its periphery.

The outer plate, on its lower side, supports the small fluid pressure motors 31 which are behind the guide blocks, in the same phase of circumferential displacement. These motors, as shown, are cylinders 32, each having a piston 33 therein and a piston rod 34 projecting from each face thereof extending through apertures in the opposite heads 35 of the cylinders. The piston rods extend perpendicular to radii from the center of the plate through the middle of the cylinder. Fluid under pressure is supplied to the cylinders by a conventional valved conduit system a showing of which is omitted from FIGURE 3 for the sake of clarity, and which is fragmentarily indicated by the pipes 47 and 47' communicating with opposite ends of the cylinder. It has not been though necessary to encumber the disclosure with a description of a complete hydraulic system, for variations in the pipe circuitry of any hydraulic system to adapt it to a specific use are well within the skill of the mechanic.

Half way between the guide blocks 28 shafts 36 are fixedly supported between the plates 26 and 30, about which four similar pulleys 37 are independently journalled, one upon the other. Independent cables 38a, individual to each of the turrets, pass about the bases of the turrets, each cable having its opposite ends attached to the respective ends of the piston rods of the corresponding motor 31. Referring to FIGURES 3 and 7, the latter showing diagrammatically one of the cable systems in tracing the circuitous paths of the cables it is understood that each of the motors 31 controls the turret which is displaced from it 135°. For instance, the motor in the northwest position controls the turret in the south position, the motor in the southwest position controls the turret in the east position, and so on. Starting with the motor in northwest position, the cable 38a extends from the lower piston rod around one of the adjacent pulleys 37, then follows the periphery of the plate 26, guided in one of the grooves in the adjacent guide block 28, then extends tangentially outward to the base of the turret in south position which it encircles, and then returns, following the periphery of the plate unit until it reaches the pulley 37 in north position and being diverted by that pulley into alinement with the upper piston rod of motor 31, to which it is attached.

The cables 38a which control one pair of opposite turrets are crossed, while the cables 38 which control the other pair of opposite turrets are uncrossed. This arrangement reverses the direction of rotation of alternate turrets and nozzles and prevents spinning of the rocket when all the turrets are operated in unison. Since the bases of the turrets are not parallel to the plates 26 and 30, nor at the same level, direction changing guide rollers 39 are provided about which the outer flights of the cables pass, see FIGURES 1 and 2. Since the piston rods 34 are all at the same level while the stacked pulleys on the shafts 36, as well as the grooves in the guide blocks, are at different levels, it follows, therefore, that the piston rods of three of the motors 31 necessarily have their outer ends to which the cables are connected angularly offset to level the flights of the cables which extend between their ends and the nearest pulley or guide block, one of which angular offsets being shown at 40 in FIGURE 4.

It is contemplated that the fluid pressure system by which the motors 31 are activated may be so valved as to enable the selective operation of the turrets individually, so that one or more may be rotated at one time, to effect control of pitch, yaw or roll. The length of stroke of the pistons 33 in the example illustrated, which is scaled down from working drawings, is such as to rotate the turrets through an arcuate range of about 30° which is ample to effect all practicel deviations in the rocket without affecting the magnitude of the normal thrust. The turrets are so displaced relative to their axes that the axes of all the nozzles, in what may be considered their normal position, are preferably parallel to the longitudinal axis of the combustion chamber, as shown in FIGURE 2. Obviously the short stroke of the hydraulic motors 31 does not cause sufficient deflection of the nozzles to affect the magnitude of the thrust of the rocket. The braking effect which carries out that object of the invention which is to suddenly slow down that stage of the rocket behind the anterior stage or payload so as to assist in the separation of the anterior stage, necessitates that the nozzles be turned to a position to which the jets issue therefrom in a forward direction, that is, at an obtuse angle to the axis of normal thrust. Short length of stroke of the motors 31 obviously limits the nozzles to a small range of deflection, restricted to the rearward area but ample for the control of normal deviations affecting yaw, roll and pitch.

In the specific embodiment herein shown for purpose of illustration, in which the turrets rotate in planes 45° displaced from the axis of the rocket, and the nozzles have one position in which they are axially parallel to the axis of the rocket, it will be necessary for the turrets to be rotated through an arc of more than 90° in order for the nozzles to discharge in a forward direction. If the planes of rotation of the turrets were at other angles than 45° to the axis of the rocket, or if the nozzles in their closest approach to the axis of the rocket were not parallel thereto, both of these factors determine the extent to which the turrets must be rotated to obtain reversal in the direction of the jets from the nozzles. In any event the essential degrees of rotation of the turrets will be greater than can be provided by the motors 31.

The invention, therefore, provides for the rotation of the unit consisting of the plates 26 and 30, on which the motors 31 are mounted, so that the cable connections between this unit and the turrets are operated independently of the hydraulic action of the motors and with a greater range of movement.

The means for rotating the unitarily connected plates 26 and 30 comprises a motor 41, consisting of a cylinder 42, with piston 43, the latter normally occupying an intermediate position in the cylinder, as shown. A piston rod 44 extends through the forward head of the cylinder and is pivotally connected at 45 to the plate 30 adjacent the periphery thereof. The cylinder is pivoted to the fixed support 46 so that it may oscillate with the piston rod. The piston rod in its retracted position is substantially radial with respect to the plate 30, being offset to one side of the center of rotation of the plate just sufficiently to be off dead center. The outward portion of the cylinder forms a pressure chamber 48. The outer end of the cylinder is closed by a threaded cap 49, a cartridge 50, which may be an electric squib, being conveniently carried within said cap, having ignition wires 51, which fit through a hole in the cap. The cartridge employed produces enough combustion gas to operate the piston without bursting the cylinder. Neither the cartridge nor the specific closure means for giving access to the pressure chamber of the cylinder 42 are claimed as part of the invention.

The cartridge is ignited by any desired means actuated in response to a function of the rocket and develops pressure adequate to rotate the loaded plate unit to the limit of its operative range of movement, rotating the turrets in unison to bring the nozzles to reverse thrust position. It is immaterial that one or more of the nozzles may be in deflecting position under the urge of its corresponding motor 31 at the time the cartridge goes off. The small possible angle of deflection is insufficient to prevent the nozzle from assuming a reverse position when the plate unit is actuated, and as previously stated, the fact that one or more nozzles may be at a slightly different angle from the rest when in reverse position does not affect the magnitude of the aggregate reverse thrust.

While I have in the above description disclosed a practical embodiment of the invention, it will be understood by those skilled in the art that the specific details of construction and arrangement of parts, as shown, are by way of example and not to be construed as necessarily limiting the scope of the invention.

I claim:

1. In a reaction motor, a chamber for confining the high pressure gases from which thrust is derived, said chamber having a rearwardly convex rear wall, a plurality of turrets projecting from the rear wall of said chamber, displaced circumferentially about the longitudinal axis of said chamber at intervals equally dividing the circumference, and rotatably mounted in said rear wall about axes inclined at equal angles to said longitudinal axis and rearwardly divergent from a common point in said longitudinal axis, a nozzle for each turret rigidly mounted thereupon, the axes of said nozzles being inclined to the axes of rotation of the respective turrets at equal angles of such magnitude that, upon rotation of said turrets through arcs of sufficient amplitude, said nozzles move from a rearward discharge position to a forward discharge position, and operating means for rotating said turrets within the range delineated by the movement of said nozzles from rearward to forward discharge positions, individually or in unison.

2. Reaction motor as claimed in claim 1, the number of turrets being multiples of 4 alternate pairs of diametrically opposed turrets being connected to rotate in opposite directions relative to the adjacent intervening pairs.

3. In a reaction motor, a chamber for confining the high pressure gases from wich thrust is derived, said chamber having a rearwardly convex rear wall, a plurality of turrets projecting from the rear wall of said chamber, displaced circumferentially about the longitudinal axis of said chamber at intervals equally dividing the circumference, and rotatably mounted in said rear wall about axes inclined at equal angles to said longitudinal axis, and rearwardly divergent from a common point in said longitudinal axis, a nozzle for each turret rigidly mounted thereupon, the axes of said nozzles being inclined to the axes of rotation of the respective turrets at equal angles of such magnitude that, upon rotation of the turrets through arcs of sufficient amplitude, said nozzles move from a rearward to a forward discharge position, and dual operating means for alternatively rotating said turrets within said delineated range, one being constructed to operate said turrets individually to move said nozzles through relatively small arcs for normal yaw, pitch and roll control, restricted to rearward thrust, the other operating means being constructed to operate said turrets in unison through arcs of sufficient amplitude to reverse direction of said nozzles from rearward to forward discharge position.

4. In a reaction motor, a chamber for confining the high pressure gases from which thrust is derived, said chamber having a rearwardly convex rear wall, a plurality of turrets extending outwardly from the rear wall of said chamber, positioned circumferentially about the longitudinal axis of said chamber and rotatably mounted in said wall on axes rearwardly divergent to the longitudinal axis of said chamber, which is the axis of normal thrust, a nozzle for each turret rigidly mounted thereupon, the axes of said nozzles being inclined to the axes of rotation of the respective turrets at such an angle that, upon rotation of said turrets through arcs of sufficient amplitude, said nozzles move from a rearward discharge position to a forward discharge position, the means for effecting this simultaneous movement of all the turrets including a turntable mounted on the rear wall of said chamber, within the circumference about which the turrets are positioned, said turntable being constructed to function as a pulley, independent cables for said turrets looped thereabout and about said turntable to transmit thrust-reversing movement in unison to said turrets, and fluid pressure motors carried by said turntable, one for each turret, connected to corresponding cables, adapted to be selectively operated to move said cables individually for controlling roll, pitch and yaw, through selective deflection of the nozzles, said fluid pressure motors being so constructed as to limit the movement of said turrets to a range of less amplitude than that required to reverse the thrust of the jets from said nozzles.

5. In combination, a vehicle having a combustion chamber for generating gases with an end wall and a longitudinal axis, four convergent-divergent nozzles mounted in the end wall of the combustion chamber, the combustion gases discharging from the combustion chamber through each of said nozzles, each of said nozzles having a throat between the convergent and divergent portions, said nozzles being arranged in diametrically opposed pairs on said end wall, each of said nozzles having a main longitudinal axis, bearing means mounted on said end wall for rotatably supporting each of said nozzles, said bearing means being so mounted that the axis of rotation of the nozzle forms an angle with the longitudinal axis of the vehicle and forms an acute angle with the main longitudinal axis of the nozzle, means for rotating said opposed pairs of nozzles to vary the angle between the main longitudinal axis of the nozzles and the longitudinal axis of the vehicle, said means when rotating a first pair of diametrically opposed nozzles in the same direction effecting a yaw control and when rotating the other pair of diametrically opposed nozzles in the same direction effecting a pitch control and when rotating either pair of diametrically opposed nozzles in opposite direction effecting a roll control.

References Cited in the file of this patent

UNITED STATES PATENTS

| | | |
|---|---|---|
| 2,024,274 | Campini | Dec. 17, 1935 |
| 2,601,104 | Douglas | June 17, 1952 |
| 2,664,700 | Benoit | Jan. 5, 1954 |
| 2,903,848 | Mayhew et al. | Sept. 15, 1959 |
| 2,912,188 | Singlemann et al. | Nov. 10, 1959 |
| 2,995,319 | Kershner et al. | Aug. 8, 1961 |
| 3,025,667 | Moorehead | Mar. 20, 1962 |

FOREIGN PATENTS

| | | |
|---|---|---|
| 968,948 | France | May 10, 1950 |
| 1,108,759 | France | Sept. 14, 1955 |
| 1,022,847 | Germany | Jan. 16, 1958 |
| 697,721 | Great Britain | Sept. 30, 1953 |